United States Patent
Rengaraju et al.

(10) Patent No.: US 7,446,795 B2
(45) Date of Patent: Nov. 4, 2008

(54) PUSH TO VIDEO SERVICE MODE SELECTION USING DEVICE SETTINGS

(75) Inventors: Ganesan Rengaraju, Oak Park, IL (US); Tomasz Jamrozy, Naperville, IL (US); Gary J. Oswald, Elk Grove Vlg., IL (US); Lawrence A. Willis, McHenry, IL (US)

(73) Assignee: Motorola Inc, Schamumburg, IL (US)

( * ) Notice: Subject to any disclaimer, the term of this patent is extended or adjusted under 35 U.S.C. 154(b) by 850 days.

(21) Appl. No.: 11/003,242

(22) Filed: Dec. 3, 2004

(65) Prior Publication Data

US 2006/0121924 A1 Jun. 8, 2006

(51) Int. Cl.
*H04N 7/14* (2006.01)

(52) U.S. Cl. .................................. 348/14.01; 348/14.02

(58) Field of Classification Search ................ 348/14.02
See application file for complete search history.

(56) References Cited

U.S. PATENT DOCUMENTS

| 2004/0190489 A1* | 9/2004 | Palaez et al. ................. 370/351 |
| 2006/0080407 A1* | 4/2006 | Rengaraju .................... 709/219 |
| 2006/0082641 A1* | 4/2006 | Rengaraju et al. ......... 348/14.02 |
| 2006/0089998 A1* | 4/2006 | Kim et al. .................... 709/229 |

FOREIGN PATENT DOCUMENTS

WO  WO 2004/072805 A2  8/2004

* cited by examiner

*Primary Examiner*—Stella L Woo
(74) *Attorney, Agent, or Firm*—Gary J. Cunningham (57) ABSTRACT

A method (600, 700) and apparatus (800) are described for selecting a Push to Video (PTV) service mode (303) allowing transmission of a video information stream (102) and a corresponding audio information stream (103) from an originating wireless communication unit (110) having floor control to a wireless target communication unit (120). Depending on a camera (420) setting, a desired PTV service mode is invoked when a PTV call is initiated by activating a PTV function.

19 Claims, 8 Drawing Sheets

PUSH TO VIDEO SERVICE MODE SELECTION USING DEVICE SETTINGS

FIELD OF THE INVENTION

The present invention relates in general to peer-to-peer or group calls between devices or communication units in a wireless communication system, and more specifically to a method and apparatus for a Push to Video (PTV) service mode from an originating communication unit to one or more remote communication units.

BACKGROUND OF THE INVENTION

With multimedia standards emerging which enable the enhancement of peer to peer and group calls with the addition of multimedia content, features have been made available to communication units in wireless communication networks such as Radio Access Networks (RANs), operated by some service providers in connection with the provision of enhanced multimedia services. Communication units are now being provided with additional features and components such as cameras and the like capable of dramatically enhancing the communication experience for users, and providing the desired multimedia content.

Some communication networks support one-to-one or group communications for voice or data services. Some networks often provide Push-To-Talk (PTT) call initiation and audio floor control. Group calls typically rely on a Push-To-Talk (PTT) call initiation, such as commonly used in dispatch radio systems. In a PTT communication, audio floor control is typically established through a contention type protocol, that is, the first communication unit to activate a PTT button when the channel is free will be granted the channel and other communication units attempting to PTT when the floor is occupied will not be granted the channel. Thus a speaker in an active communication must press a talk button (PTT button) before talking and release the talk button when finished talking to relinquish the floor thus allowing another participant in the call to obtain the floor.

PTT communications may be conducted using Session Initiation Protocol (SIP) as described, for example, in Internet Engineering Task Force (IETF), Request For Comments (RFC) 2543, 3261, and 3265. Present systems do not provide or support flexible multimedia services such as may be available with communication unit technology such as cameras and the like.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION

In overview, the present disclosure concerns a PTV service mode associated with a peer to peer or group call between an originating wireless device and one or more target communication units operating in a communication system or including a Radio Access Network (RAN). One or more of the communication units can be, for example, a stationary or fixed wireless receiver, communications unit, User Entity (UE), or an originating wired device having an Internet connection, and the like which supports packet switched data communication. Further disclosed and described is a method and apparatus for selecting a Push to Video (PTV) service mode for use between the communication units based on a device setting such as a camera setting in any of the communication units or User Entities or Equipments (UEs) associated with the call.

In accordance with various exemplary embodiments, PTV services share some characteristics with "Push to Talk" (PTT) service for audio. PTV is a real-time direct one-to-one or one-to-many video and audio communication service. Streaming multimedia sessions can be initiated and sent to both individuals and talk groups with a push of a key (PTT button). The multiple service modes described above are typically supported in a PTV application.

In a PTV Stream mode, a user can stream audio or video asynchronously to the respective UE associated with each session participant. At the start of a session, an initiating UE owns both the audio and video floor. The initiating UE can make an introductory comment about the video, typically sourced from an "external" camera or camera view, and, for example, elicit audio responses from the peer or group. The initiating UE can then relinquish the audio floor to allow responses to be generated while still streaming video. In the PTV Stream mode of operation, the floor control for audio and video media is handled asynchronously, and both peer to peer and group calls are supported.

In a PTV Chat mode, a user can stream audio and video synchronously to the respective UE associated with each session participants. The real-time audio and video streams are synchronized as the floor owner speaks to a peer, or group. When a participant gives up the floor, a listening peer or group user may then acquire the floor control and stream synchronized audio and video which is sourced from an "internal" camera or camera view, that is, a view directed toward the user. All participants then hear/see the new floor owner. In the PTV Chat mode of operation, the floor control for both audio and video media is always handled synchronously, and both peer to peer and group calls PTV sessions are supported.

In a PTT mode, the PTV feature allows the UE to participate in a PTT, audio only, session. No video media capability is included in the session setup and both "internal" and "external" cameras or camera views are disabled. It should be noted however that, as will be described in greater detail herein below, the ability to add a video stream in the existing audio session will also be supported as will the ability to remove a video stream after adding a video stream. Both peer to peer and group calls are supported in PTT mode.

In the PTV Video mode, a Circuit Switched (CS) voice call can be initiated by a UE. If, after call set up, one of the peer members realizes the need to share a live stream of an event in real-time, an additional packet switched (PS) session is initiated in the packet domain containing only video with no audio capability specified. Control of the video floor can be analogous to the audio-only scenario, such as the PTT mode. No synchronization of the CS based voice and PS base video is assumed.

As noted a PTT call can be upgraded with PTV services enabling a user to "Add video stream" on an existing PTT call. A Call Preference setting enables a user to select a specific PTV call mode, such as: PTV Stream, PTV Chat or PTT. Depending on the Call Preferences setting, adding a video stream will transition the existing PTT call into either a PTV Stream or PTV Chat depending on whether the internal or external camera or camera view is selected. A PTV call can further be downgraded with PTV services enabling a user to "Remove video stream" on an existing PTV Chat or PTV Stream call. It should be noted that a UE needs to own floor control for both audio and video before initiating a downgrade.

As noted above, PTV is a real-time direct one to one or one to many audio and video communication service. A PTV session can be established between the originating communication unit and one or more target communication units when the originating communication unit initiates a PTV service with an action such as pressing a PTV button in a manner similar to a conventional PTT activation.

It will be appreciated that the inventive concepts discussed and described herein related to PTV in accordance with various exemplary embodiments, may be performed in a dedicated device such as a communication unit having a dedicated processor, a processor with appropriate software for performing a communication unit function, an application specific integrated circuit (ASIC), a digital signal processor (DSP), or the like, or various combinations thereof, as would be appreciated by one of ordinary skill. Memory devices may further be provisioned with routines and algorithms for carrying out various aspects of the invention which will be described in greater detail hereinafter.

It will further be appreciated that the terms communication unit or wireless communications unit generally refer to subscriber devices such as cellular or mobile phones, two-way radios, messaging devices, personal digital assistants, personal assignment pads, personal computers equipped for wireless operation, a cellular handset or device, or the like, or equivalents thereof provided such units are arranged and constructed for operation in accordance with the various inventive concepts and principles embodied in, for example, exemplary communication units and methods capable of generating a video stream and operating in a PTV environment often under appropriate specifications, standards, and protocols as discussed and described herein.

The principles and concepts discussed and described may be particularly applicable to communication units, devices, and systems providing or facilitating packet based voice communications services or data or messaging services over wide area networks (WANs), such as conventional two way systems and devices, various cellular phone systems including analog and digital cellular, CDMA (code division multiple access) and variants thereof, GSM (Global System for Mobile communications), GPRS (General Packet Radio System), 2.5 G and 3 G systems such as UMTS (Universal Mobile Telecommunication Service) systems, Integrated Digital Enhanced Networks and variants or evolutions thereof. Principles and concepts described herein may further be applied in devices or systems with short range communications capability normally referred to as W-LAN capabilities, such as IEEE 802.11, Bluetooth, or Hiper-LAN and the like that preferably utilize CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

Further in accordance with various exemplary and alternative exemplary embodiments, the packet based RAN can include a Code Division Multiple Access (CDMA) RAN, a Global System Mobile (GSM) RAN, Universal Mobile Telecommunication System (UMTS) RAN, a Data Only (DO) RAN, a High Rate Packet Data Access (HRPDA) RAS, a Wireless Local Area Network (WLAN) RAN, or an Evolution Data Voice (EVDV) RAN. The exemplary RAN should support communications under the IP Multimedia (IM) core specifications, for example as outlined in the Third Generation Partnership Project (3GPP) Technical Specification (TS) 24.229 for communications using Session Initiation Protocol (SIP), Session Description Protocol (SDP) and variants thereof. It will be appreciated that other 3GPP specifications and standards may also be relevant herein. For example, in accordance with some exemplary embodiments, the invention may require devices such as video codecs and the like to be used which codecs will generally conform to specifications described in 3GPP TS 26.235 or the like.

Further in accordance with various exemplary embodiments, the present invention can be embodied as a higher layer, such as application layer software application including a user interface (UI) application, graphical user interface (GUI) application or the like. This makes the lower protocol layers, such as the data link layers, largely interchangeable provided the lower protocol layers support packet switched communication although some circuit switched functionality, such as used in a video-only mode, is described in greater detail hereinafter. It should be noted that in accordance with the above noted standards, multimedia streams can be transmitted over Real Time Transfer Protocol (RTP) /Universal Data Protocol (UDP) and corresponding floor control is transmitted over Real Time Transfer Control Protocol (RTCP)/ UDP.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. The invention may further include a process with steps, procedures, or the like. Where steps are indicated, they may be performed in any order, unless expressly and necessarily limited to a particular order, i.e. steps that are not so limited may be performed in any order. In certain cases, the steps may be repeated a number of time or may loop infinitely until a particular event occurs or the like.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to various exemplary embodiments.

Figure 1:
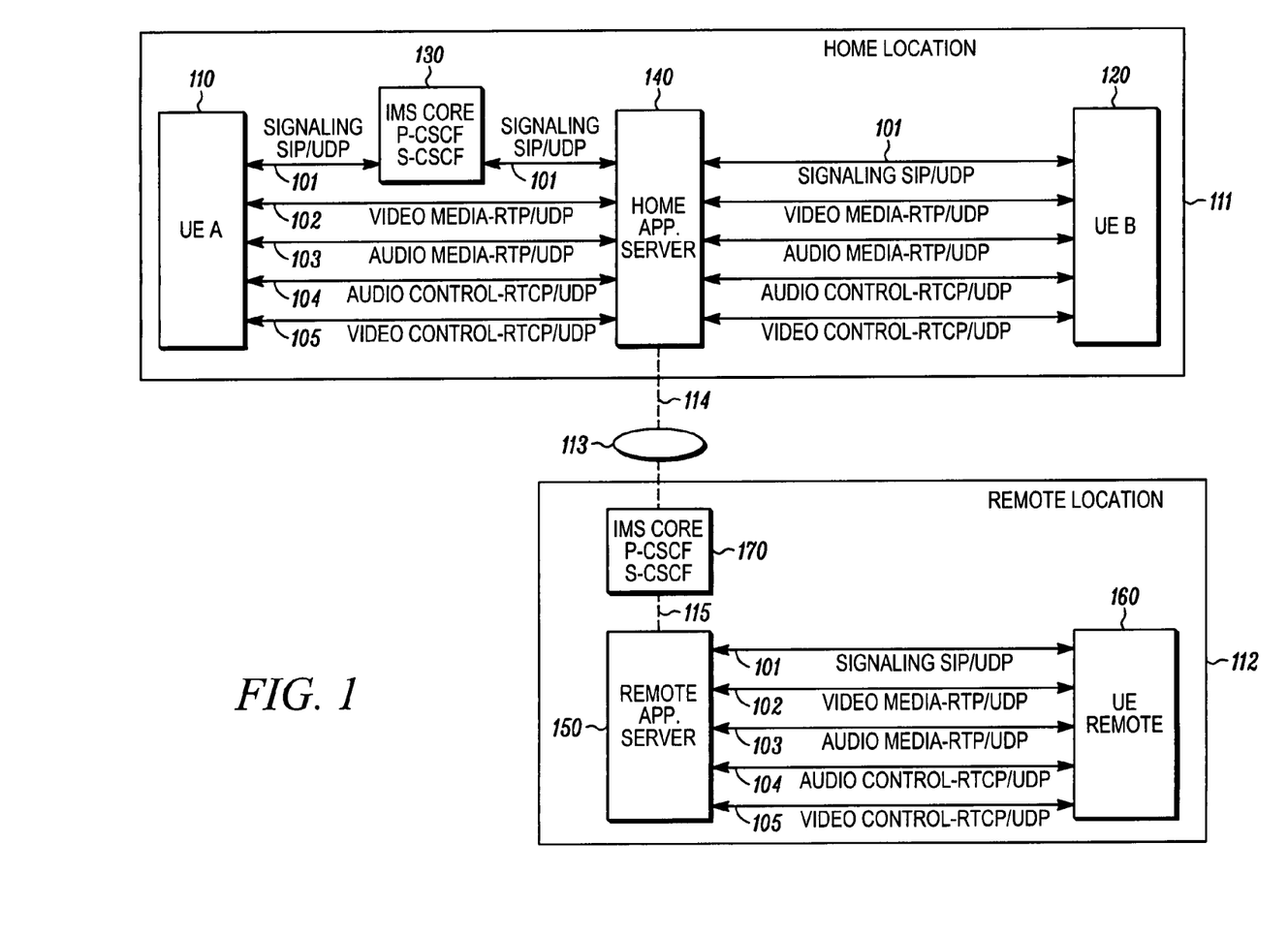
FIG. 1 is a diagram illustrating an exemplary peer-to-peer Push to Video (PTV) call environment in accordance with various exemplary embodiments.

With reference to FIG. 1 an exemplary Push to Video (PTV) environment capable of supporting a peer-to-peer call is shown and will be discussed and described. In accordance with PTV operating principles, an originating communication unit 110 associated with, for example, User Entity (UE) A, can engage in a communication session with a target communication unit 120 associated, for example with UE B, within home location 111 wherein a video media stream 102, an audio media stream 103, an audio control path 104, an a video control path 105 are established therebetween, for example in accordance with Internet protocol Multimedia Subsystem (IMS) and SIP procedures. It will be appreciated that communication unit 110 and 120 can refer to any communication device such as is commonly referred to in the art as a User Entity (UE). It will also be appreciated that the session can be conducted in connection with an IMS core 130 and can be established through, for example, a home application server 140 which can transfer the audio and video streams to the target communication unit 120 or other units in the PTV call. The IMS core 130 acts as a Proxy-server Call State Control Function (P-CSCF), which is an initial interface (SIP Server) between the originating communication unit 110 and the IMS core 130. The address of the P-CSCF is discovered as part of the SM (Session Management) procedures involved with establishing IP connectivity. That is, the address of the P-CSCF may be provided during the PDP Context Activation process. Alternatively, the address may be resolved after the PDP Context Activation process through the DHCP (Dynamic Host Configuration Protocol) Query/Response process. In accordance with DHCP, the originating communication unit 110 will request an IP Address plus other variables in order to establish an IP session or sessions associated with the call.

Further in accordance with IMS and SIP procedures, during initial session establishment, the IMS core 130 can determine a set of media characteristics including a common codec or set of codecs using end-to-end message exchanges to determine the full scope of media characteristics when a PTV service mode is selected that requires video service. In one embodiment to be described in greater detail hereinafter, a circuit switched connection can be established and can be upgraded with a video stream or can be downgraded by removing a video stream. The session initiator, that is originating communication unit 110, makes the final determination of the codec or codecs to be used at least initially. It will be appreciated that changes to the media characteristics can be made during the session if they have already been included in the initial list of media characteristics and require no further resources. A session change can be initiated if additional resources are needed.

It will further be appreciated that in order to begin session negotiation, originating communication unit 110 can include its terminal capabilities including codecs, user preferences, bandwidth requirements, local port number assignments for possible media streams, and the like into an SDP payload to be included in a SIP INVITE message which is passed to the IMS core 130. It should be noted that a feature tag value can be set to, for example, "ptv.fullduplex", or the like to indicate that the session will be a PTV session. If multiple media streams are presented, multiple codec choices can be offered for each stream. The IMS core 130 can examine the payload transmitted with the SIP INVITE message and if parameters are found which, for example, violate local policy the session initiation attempt can be rejected with information sufficient to allow the originating communication unit 110 to re-establish the session with new parameters (see, Internet Engineering Task Force (IETF), Request for Comments (RFC) 3261). The IMS core 130 forwards the SIP INVITE message to the target communication unit 120 which then determines the complete set of codecs it is capable of supporting and further determines the intersection of this set and the set of codecs sent in the SIP INVITE message. For media streams not supported, the target communication unit 120 can construct an SDP with port assignments set to zero, otherwise, for streams that are supported a port assignment can be returned. The answer SDP can be returned to the IMS core 130 which can then authorize Quality of Service (QoS) resources for the assigned streams.

Once the packet switched call is set up, for example, using Session Initiation Protocol (SIP) messaging on a signaling channel 101 and through the IMS core 130 as noted above, a packet switched session can be conducted with the target communication unit 120 through the home application server 140. In addition to audio information transferred in the audio stream 103, video information can be transferred between the originating communication unit 110 and the target communication unit 120 through the video media stream 102. It should be noted that the video media stream 102 is capable of supporting a continuous stream of packet video data once the packet switched call is set up. The audio media stream 103, as noted, is typically established in a half duplex mode since, according to floor control oriented group call protocols, only one speaker may be active at one time. It will be appreciated that through the use of Talk Permit Tones (TPT), or the like, peers or members of the group call can identify when it is possible to talk, e.g. after the PTT or PTV button is pressed and a TPT is generated. As can be seen and appreciated by one of ordinary skill in the art, five communications sockets 101-105 are required, two for the video stream, two for the audio stream and one socket for signaling and control. In accordance with various exemplary embodiments, the term socket as used herein can refer, for example, to a software interface, driver, operating system extension or the like, for handing the transfer and control streaming data, for example in accordance with a lower level protocol.

In accordance with embodiments involving calls within the home location 111, audio and video media stream establishment can proceed generally as noted above. However, if a call is placed to a UE outside the home location 111 of originating communication unit 110, such as to a remote location 112, the SIP INVITE message associated with call establishment can be redirected to a remote target communication unit 160 associated with a remote UE via a remote application server 150 using IP network connections 114 and 115 to an IP network 113. Further, the initial call establishment negotiation as described above, can proceed with IMS core 130 communicating the contents of the SDP payload associated with the SIP INVITE message to an IMS core 170. After the contents are examined, the IMS core 170 can reject the initiation attempt if any of the parameters are in conflict with local policy. Otherwise the SDP payload and SIP INVITE are forwarded by the IMS core 170 to the remote target communication unit 160 which then can determine its own codec parameters, compare the parameters with parameters in the SIP INVITE and construct an SDP answer message with, as noted above, the port assignments for unsupported media streams set to zero and valid port assignments for supported media streams. The SDP answer is passed back to the originating communication unit 110. The negotiation process can continue until a final set of media streams are agreed upon.

The audio media stream 103 carries AMR (adaptive multirate) encoded RTP speech bursts and can also carry Dual Tone Multi Frequency (DTMF), Silence Descriptor (SID) and Discontinuous Transmission (DTX) packets. The overall packets for audio flow are AMR/RTP/UDP/IP. A typical bandwidth requirement for an AMR-encoded audio payload is 5.15 kbps for normal AMR Narrow Band and 12.2 kbps for high end AMR Wide Band. The audio media stream 103 can consist of fixed packets having a size of 72 bytes including an uncompressed RTP/UDP/IP header every 20 ms, for AMR encoded speech with a maximum bandwidth of 12.2 kbps.

The video media stream 102 carries MPEG4 or H.263 encoded RTP packets. Real time conversational bi-directional streaming class Quality of Service (QoS) will be required. The video media stream 102 can consists of packets having a size of around 72 bytes including an uncompressed RTP/UDP/IP header for transfer speeds up to 7 frames per second, for an MPEG-4 or H.263 encoded stream with a bandwidth of 38 to 42 kbps.

The audio control path 104 and the video control path 105, consist of RTCP packets carried over UDP/IP and containing media control information for audio and video streams on a separate data path. Each RTP media channel can have an associated RTCP control channel which carries different packet types such as sender and receiver reports for quality feedback, and messages for carrying floor control information, for example, in the RTCP APP (APPlication specific) payload designated for application specific data. The RTCP control channel characteristics include variable packets with a size no longer than corresponding RTP packets, and intermittent message transfer. The bandwidth for the RTCP control channel can be 5% of the total bandwidth for RTP/RTCP flow.

The PTV bearer requirements involve an exemplary radio access network providing bearers to transport the application flows noted above. The bearer requirements to support the PTV services described herein are consistent with the Application Level Signaling specified in TS 23.228 Release 5 specification section 4.2.6 and PoC Specification Release 1.0 section 8.1. An interactive traffic class with highest priority should be used for SIP/SDP signaling bearer with a primary PDP context. For the audio media stream 103, assuming the exemplary radio access network supports the streaming class and the local policy allows its usage, then a primary or secondary PDP context with streaming class should be used to carry speech bursts in AMR/RTP/UDP/IP packets. The same Packet Data Protocol (PDP) context and hence the same bearer should be used to multiplex the associated audio control flow over RTCPIUDP/IP. It should be noted that if the radio access network does not support the streaming class or the usage is subject to local policy, then a PDP context with an interactive class with highest priority should be used to carry speech burst in AMR/RTPJUDP/IP packets. The same PDP context and hence the same bearer should be used to multiplex the associated audio control flow over RTCP/UDP/IP. For the video media stream 102, assuming the exemplary radio access network supports the streaming class and the local policy allows its usage, then either a primary or a secondary PDP context with streaming class should be used to carry the video stream on H.263 or MPEG4/RTP/UDP/IP packets. The same PDP context and hence the same bearer should be used to multiplex the associated video control flow over RTCP/UDP/IP. If the radio access network does not support the streaming class or the usage is subject to local policy, then a PDP context with an interactive class with highest priority should be used to carry the video stream over H.263 or MPEG4/RTP/UDP/IP packets.

Further in accordance with various exemplary embodiments, several permutations of PDP contexts are possible. Where separate PDP contexts with streaming class for media and interactive class for signaling are used, the PDP context for signaling should be on primary, and the PDP context for media can be either on primary or secondary. Where one PDP context with streaming class for media and another PDP context with interactive class for signaling is used, the PDP context for signaling should be primary and the PDP context for media can be either on primary or secondary. Where separate PDP contexts with interactive class for media and signaling are used, the PDP context for signaling should be on primary and the PDP context for media can be either on primary or secondary. Where one PDP context with interactive class for media and another PDP context with interactive class for signaling is used, the PDP context for signaling should be primary and the PDP context for media can be either on primary or secondary. Lastly, a protocol architecture for RTP/RTCP and SIP multiplexing can include one primary PDP context with interactive class for media and signaling.

Figure 2:
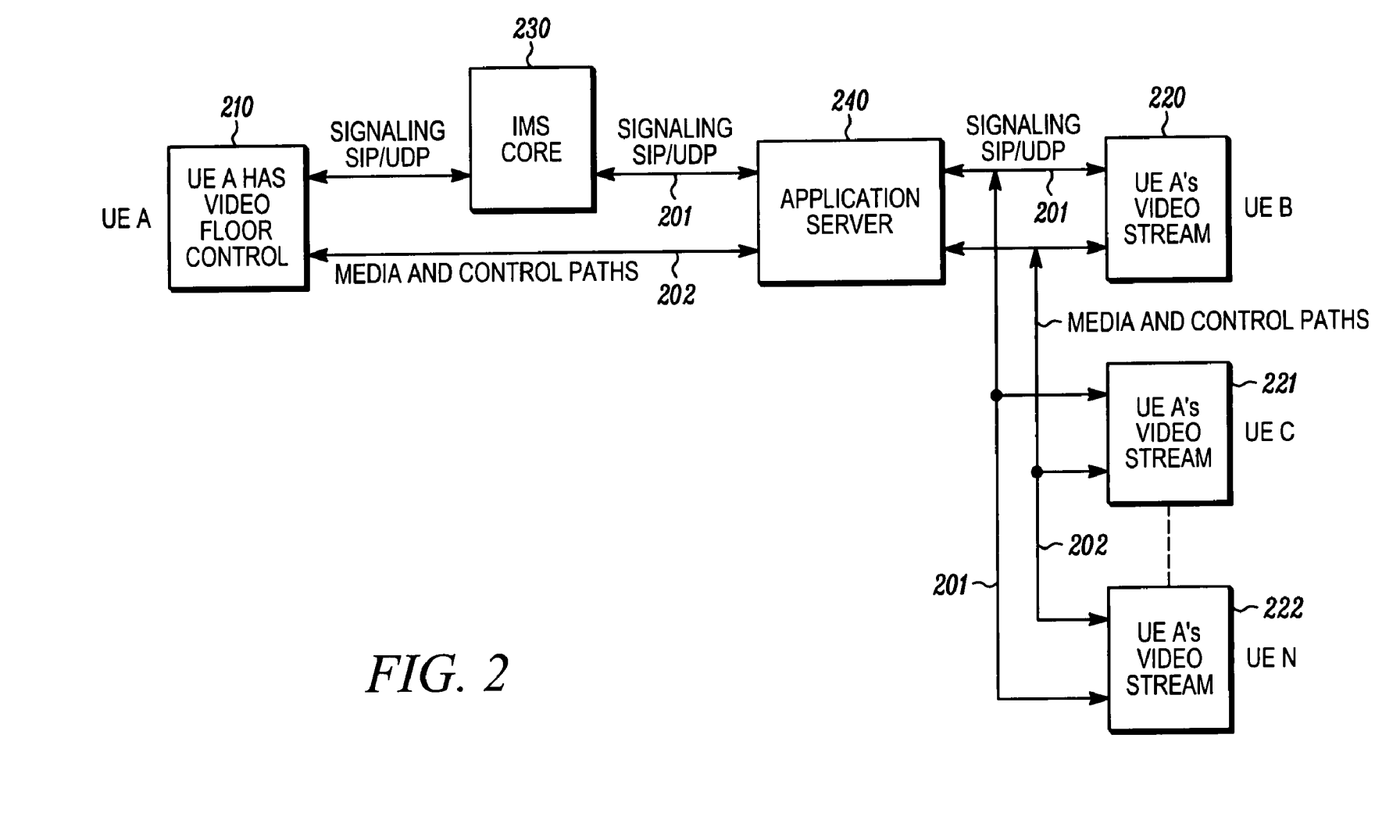
FIG. 2 is a diagram illustrating an exemplary PTV group call environment in accordance with various exemplary embodiments.

Referring to FIG. 2, an originating communication unit 210, similar to the originating communication unit 110 of FIG. 1 and associated with, for example, UE A, is configured to initiate a group call, for example, with some or all of target communication units 220, 221, and 222, associated with, for example, UE B, UE C, . . . , UE N. It will be appreciated that in accordance with accepted procedures, such as for example are specified in connection with SIP standards, a PTV call can be initiated and a video media stream and an audio media stream established when audio and video floor control is obtained depending on the PTV service mode. It should be noted for example that the initiating UE of the PTV calls, in the PTV Chat service mode or the PTV Stream service mode will get the floor control for both audio and video. When the PTV button or the like activator is pressed or otherwise activated, the "To" field will contain a SIP Universal Resource Identifier (URI) for the group address or identity of UE A, UE B, and UE N and this can be passed to an IMS core 230, similar to the IMS core 130 described above. The application server 240 will resolve the individual addresses of the UEs associated with the URI and form a List Management Services entity as will be appreciated by one of ordinary skill. The application server 240 can then generate individual SIP INVITE messages to the target UEs and conduct SIP exchanges therewith.

Responses from each target UE can be forwarded to the originating communication unit 210 using SIP NOTIFY messages as would be appreciated by one of ordinary skill in the art. For simplicity, the video media stream and audio media stream and audio and video control portions, described above in connection with FIG. 1 for example as the video media stream 102, the audio media stream 103, the audio control path 104, and video control path 105, are combined in FIG. 2 as a media and control path 202. It will also be appreciated that SIP signaling can be conducted using a SIP/UDP signaling channel 201 to moderate the group call, for example, by joining late users and inviting and joining new users and the like. Once floor control is established, the originating communication unit 210 will be in a TALK mode and the target communication units 220-222 will be in a LISTEN mode and set up to receive the video stream associated with the originating communication unit UE A 210. As noted above, if the target UEs are in remote locations, then the SIP INVITE messages associated with establishing the call can be routed to the remote application servers associated with the remote locations of respective remote targets. Otherwise, calls within an area served by the same local or home application server will proceed as described.

The video media stream portion of the media and control path 202 is established to conduct transfers of video, and the audio stream portion of the media and control path 202 is established to facilitate various PTV service modes which support audio including PTT or audio only modes as will be described. In a group call, the originating communication unit 210 and each of the target communication units 220-222 can send and receive a stream of audio and/or video information to and from all or a select number of the other users in accordance with various PTV service modes when floor control is obtained. At other times, and depending on the PTV service mode, users can listen to the user having floor control while watching a video stream from a user with video floor control and can send a video stream if equipped with a camera and video processing and transmission capability and floor control is relinquished by the first user and obtained by the next user. To accomplish the transfer of multiple video streams, it will be appreciated that the application server 240, for example, must mix or multiplex video streams from the target communication units 220-222 and synchronize the audio stream from the UE having floor control using approaches known to those of skill in the art. The application server 240 can multicast the multiplexed video streams to all users using for example the group identifier or address.

It should be noted that the initial session negotiation using SIP INVITE messages exchanged with the IMS core 230 can be established in a similar manner as described above when the group call target UEs are within a home location. When some or all of the group call target UEs are within one or more remote locations, the IMS core 230 can forward the SIP INVITE to the IMS core serving the location or locations where the remote LJE or UEs are situated.

Figure 3:
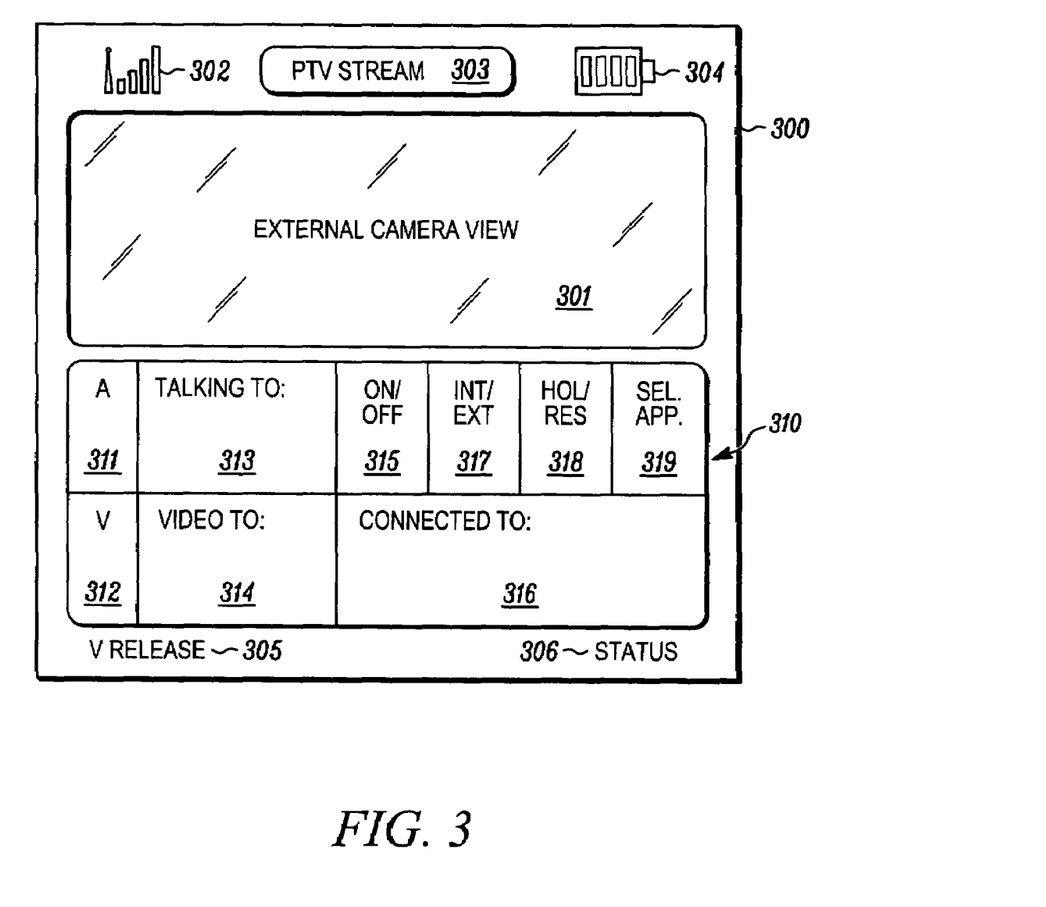
FIG. 3 is a diagram illustrating an exemplary user interface having a display of elements including a PTV service mode in accordance with various exemplary embodiments.

A user interface can be provided as shown in FIG. 3, where a display 300 when under the control of an application program, operating system, or the like as would be understood and appreciated by one of ordinary skill in the art, can be configured or caused to display certain icons, windows, and the like for displaying information in accordance with various exemplary embodiments depending, for example, on the current operating mode or state of the underlying application program or the like. When in an appropriate mode, a camera view window 301 can display the present video data stream depending on the camera setting. For example, if the camera is set to an internal view, the camera view window 301 can display the video data stream being generated by the internal camera. Likewise, if the camera is set to an external view, the camera view window 301 can display the video data stream being generated by the external camera, for example as shown. Other indications include a signal strength indicator 302, a PTV service mode indicator 303, a battery charge indicator 304, a Video status indicator 305, a Status indicator 306, and the like.

In accordance with various exemplary embodiments, for example when a session is in progress or when a video setting is being previewed, video status and information panel 310 can be displayed including audio panel 311 adjacent to which a "Talking To:" window 313 can display the identifier associated with the audio target communication unit or group and a "Connected To:" window 316. A video panel 312 can display a "Video To:" window 314 showing the identifier associated with the video target communication unit or group. An "ON/OFF" indicator 315 can provide an indication of the present camera state, an INT/EXT indicator 317 can provide an indication of whether the internal camera view or external camera view is selected. A Hol/Res indicator 318 can provide an indication of whether a present call or operation is holding. A Sel. App. Indicator 319 can provide a soft button or the like to select applications, application preferences or the like.

Figure 4:
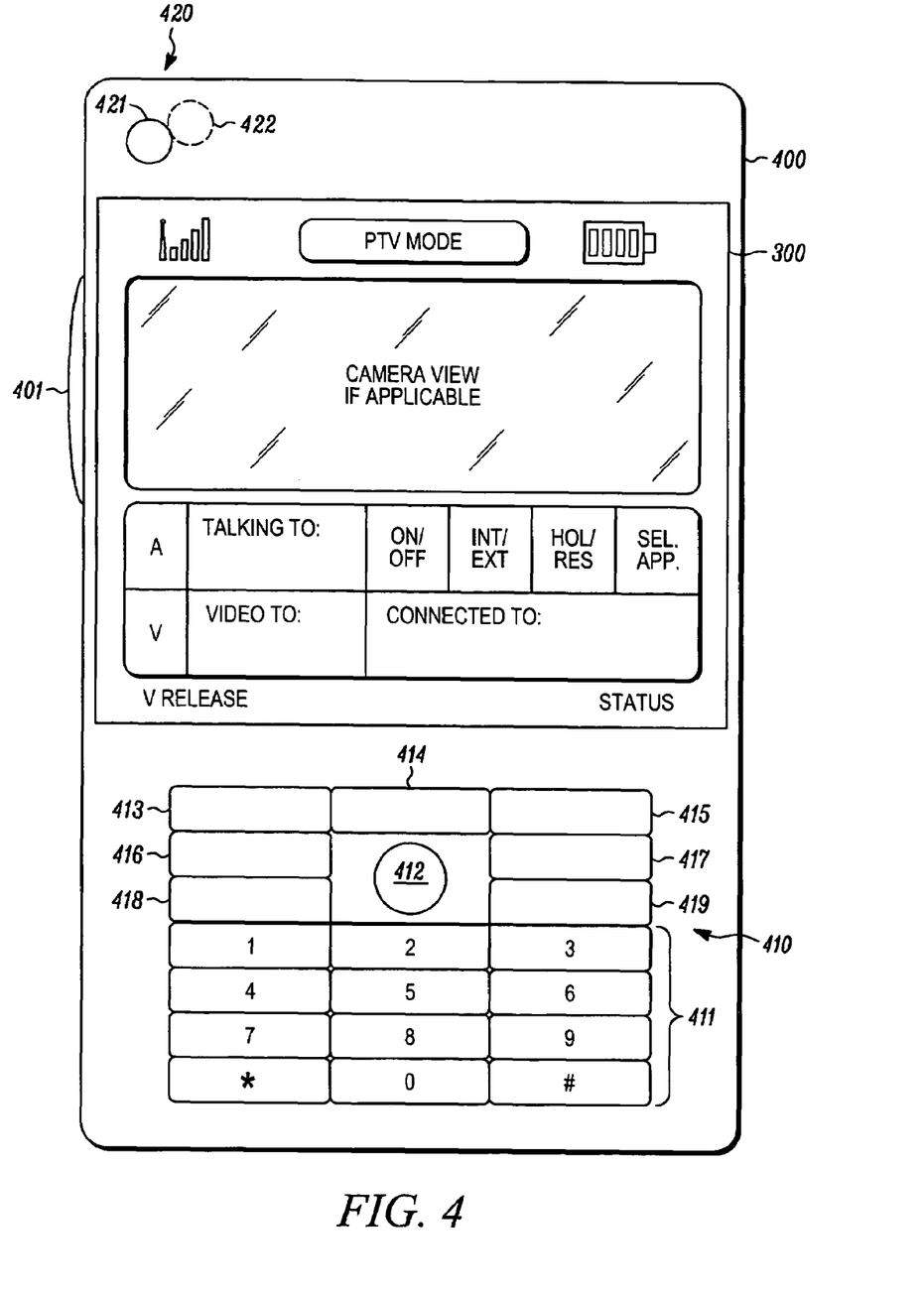
FIG. 4 is a diagram illustrating an exemplary communication unit with various components associated with providing a PTV service in accordance with various exemplary embodiments.

In FIG. 4, a view of an exemplary cellular telephone handset 400 is shown with display 300 as described for example hereinabove in connection with FIG. 3. A PTV button 401 can be used to invoke the PTV service in accordance with the settings and PTV service mode selected in accordance with various exemplary embodiments. In order to conduct calling operations and to provide input, a keypad interface 410 can be provided including, for example, a Dual Tone Multi-Frequency (DTMF) keypad 411, a multi-directional joystick button 412, and a series of reconfigurable buttons 413-419. The handset 400 can also be equipped with camera unit 420, configured with an "internal" camera view 421 and an "external" camera view 422. It will be appreciated that in accordance with various exemplary embodiments, camera unit 420 can be a digital charge coupled device (CCD) camera or the like with a dual lens system, or can be two CCD cameras, or the like that can, for example, direct data to a common video processing unit.

Figure 5:
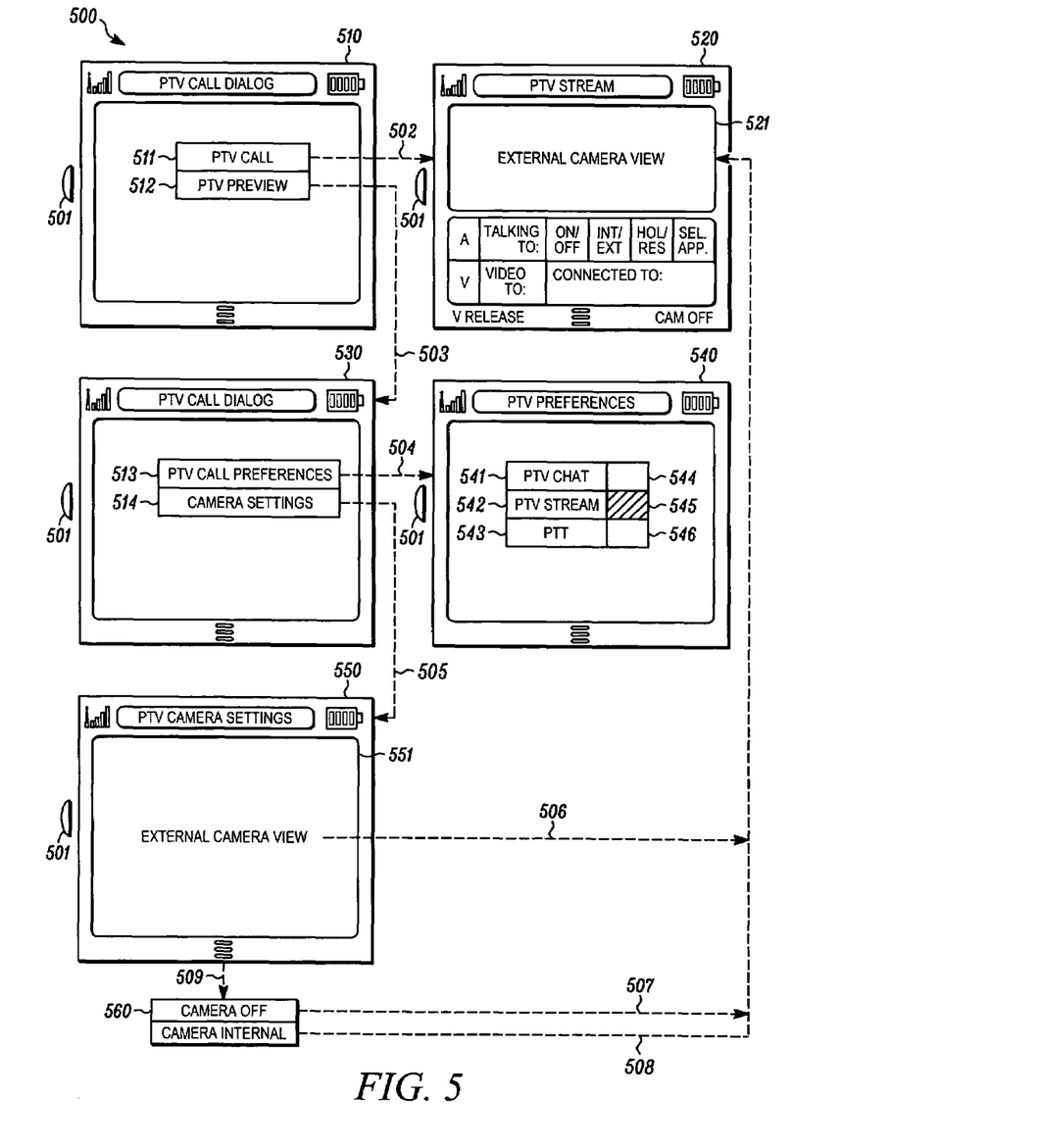
FIG. 5 is a diagram illustrating exemplary functional transitions associated with various settings, preferences, service modes, and the like in accordance with various exemplary embodiments.

A series of functional flows 500 as shown in FIG. 5, can be used to illustrate exemplary operation in accordance with various exemplary embodiments. In screen 510, a PTV call dialog is shown where a PTV Call selection 511 can lead through flow 502 to a PTV Stream screen 520 with a PTV Stream call view 521 where, based on the selection of the external camera view, the PTV Stream service mode is selected as will be described in greater detail hereinafter. From a PTV Preview selection 512, a flow 503 can lead to a PTV Preview screen 530 where a PTC Call Preferences selection 513 can lead through flow 504 to PTV Call Preferences screen 540. The PTV Preview selection 512 can be enabled with flexible settings. Normally the preview is not viewable, however when enabled, a user can see the PTV Preview.

It is important to note that PTV call preferences can be viewed as related to camera settings 514. In accordance with various exemplary embodiments, the "Camera Setting" is a flex setting which is enabled, for example, if a customer or user chooses to use for example a software load or flex. Otherwise, "Call Preference" is the typical manner in which the initiation mode: PTT, PTV Chat or PTV Stream is chosen. A selection made from "Camera Setting" when enabled, will take precedence over a "Call Preference" setting. For example, a PTV Chat service mode window 541 and a corresponding PTV Chat camera setting window 544 show that according to the presently set preferences, the present camera setting, such as the external camera setting, will not result (blank window) in a PTV Chat service mode being invoked when a PTV call is initiated. A PTV Stream service mode window 542 and a corresponding PTV Stream camera setting window 545 show that according to the presently set preferences, the present camera setting such as the external camera setting, will result (cross hatched window) in a PTV Stream service mode being invoked when a PTV call is initiated. A PTT service mode window 543 and a corresponding PTT setting window 546 indicate that according to the presently set preference, a PTT service mode will not result (blank window) in a PTT service mode being invoked when a PTV call is initiated. The Camera Settings selection 514 can lead through a flow 505 to a PTV Camera Settings screen 550. It can be seen that an External camera view in PTV Camera Settings screen 550 can be associated through flow 506 with the PTV Stream service mode 520 which will be invoked when the PTV service is initiated.

In response to a button press such as the selection of an extended menu 551, a camera settings menu 560 can be invoked through flow 509 where a camera off setting 507 can potentially affect the view for the PTV modes such as the PTV Stream mode 520. As noted above, the camera settings can be made available from a software flex or load and when changed will result in a new set of indications in, for example, the PTV Call Preferences Screen 540 such as an indication of which PTT service mode will be invoked when a PTV call is initiated. A camera internal setting 508 can potentially affect the view for the PTV modes such as the PTV Stream mode 520 as noted above and may also result in an indication, for example, in the PTV Preferences window 540, of the corresponding PTV service mode which will be invoked when a PTV call is initiated.

Figure 6:
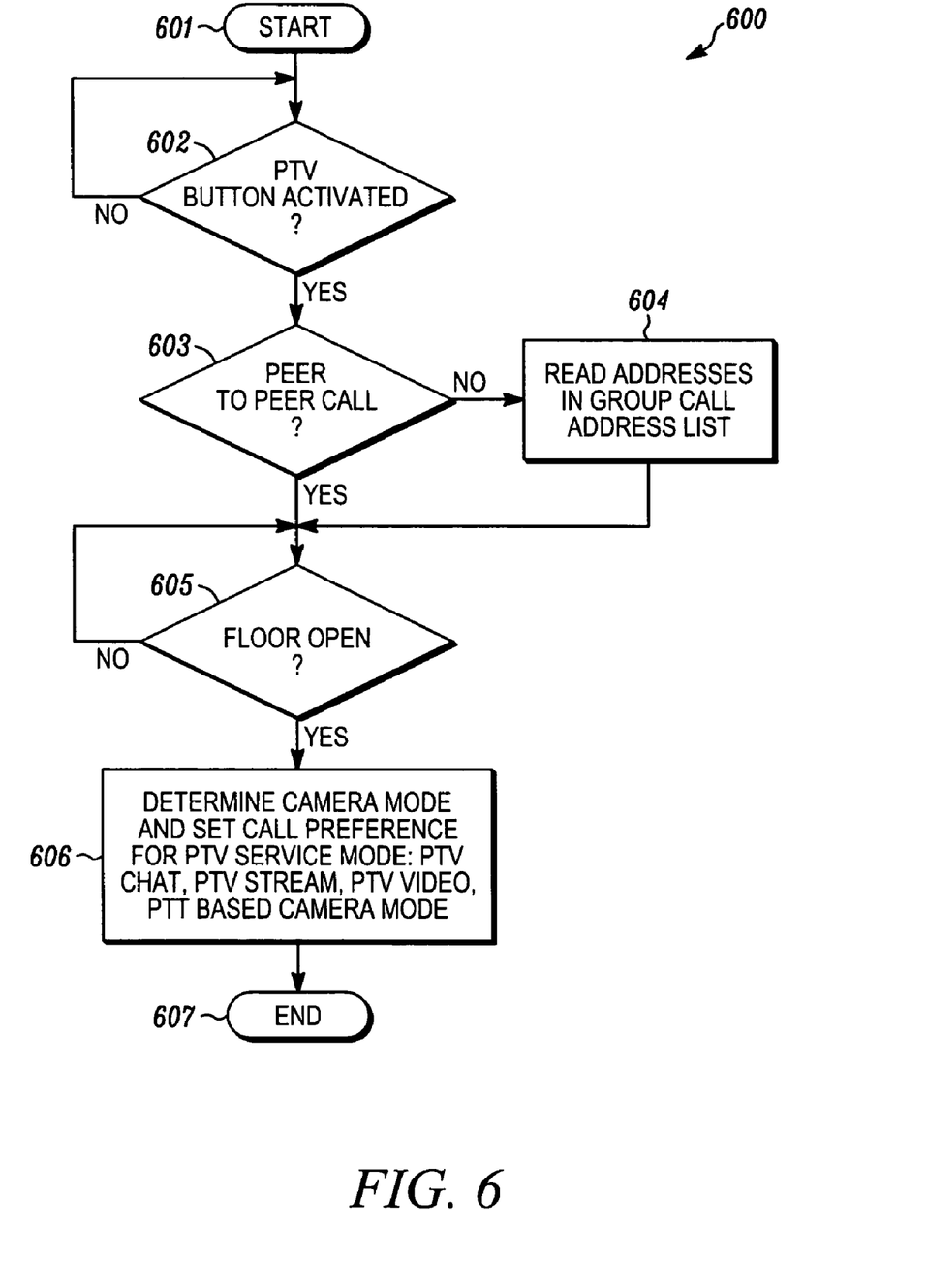
FIG. 6 is a flow chart illustrating exemplary procedures in accordance with various exemplary embodiments.

It will be appreciated from the above discussion that many of the features of the present invention can be implemented in a software program such as an application program or in a series of intercommunicating software programs, application, routines, modules, operating systems and the like. In addition, much of the functionality can be practiced as a method or procedure with a series of steps or the like. An exemplary procedure 600 is shown in FIG. 6, and begins at start 601. During operation of, for example, the exemplary originating device, which as will be appreciated can at one time or another be any of the communication units involved in the peer to peer or group calls described herein above, a test that is continuously repeated can be made to determine whether a PTV button, activator or the like has been pressed at 602. Alternatively, an interrupt can be generated when the button or activator is pressed or activated at which point activation will be deemed to have occurred.

Once activation has occurred, it can be determined at 603 whether the call is a peer-to-peer or group call for the purposes of determining whether a contact or address list must be consulted. If the call is a peer to peer call, it can be determined at 605 as to whether and when the floor is open, for example through the issuing by the system of a command corresponding to a Talk Permit Tone as described herein above. Alternatively, it will be appreciated that a peer-to-peer call can be considered a subset of a group call where there is only one contact in the contact or address list. Thus, if the call is considered a group call, the addresses from a contact or address list can be read at 604 and, again, it can be determined whether and when the floor is open at 605. If the floor is open, a camera mode, setting, or the like can be determined at 606 so as to set the PTV Service mode to one of PTV Chat, PTV Stream, PTV Video, PTT or the like, based on the determined camera setting. The resulting PTV call to one or more target communication units associated with the peer to peer or group call, for example can be notified using a SIP INVITE message in accordance with the addresses listed in the contact list or in the peer-to-peer contact information. In addition, as will be described in greater detail hereinafter, a call can be upgraded or downgraded by adding or removing a video stream from the call.

Figure 7:
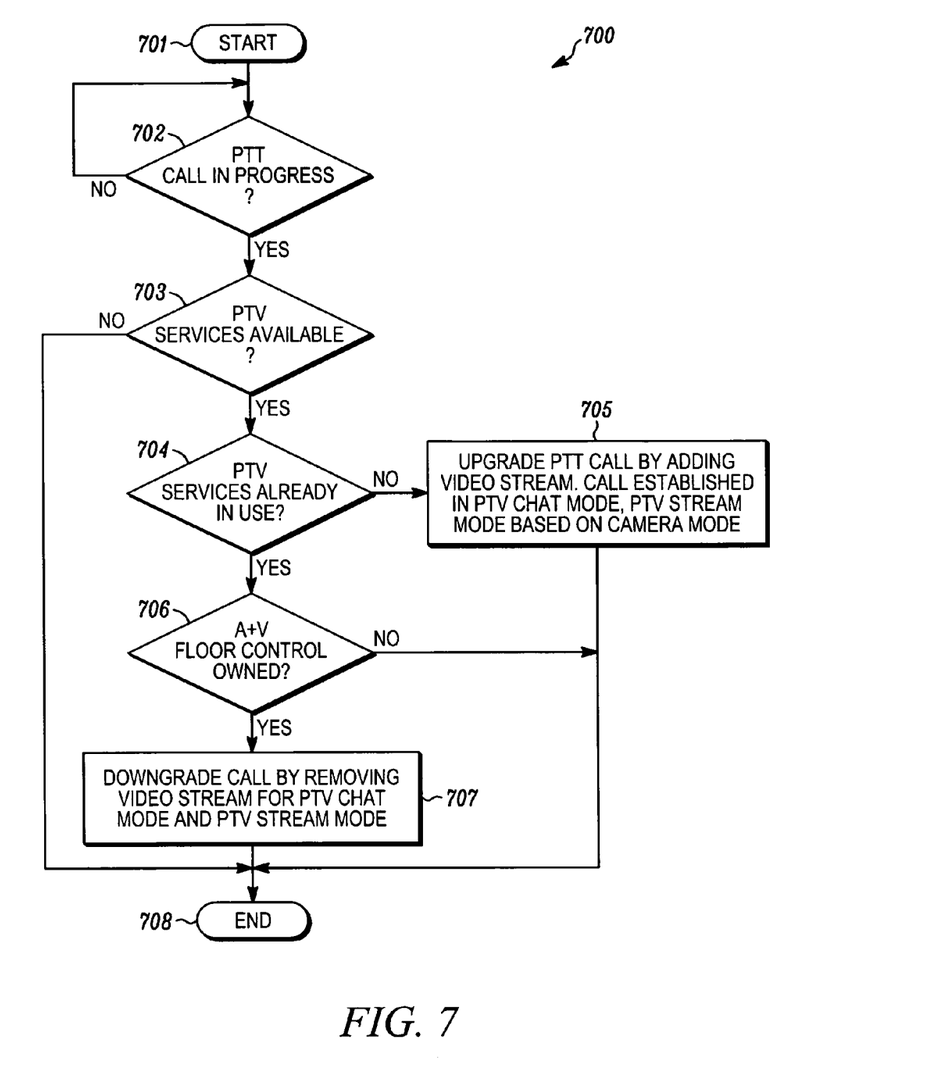
FIG. 7 is a flow chart illustrating exemplary procedures in accordance with various exemplary embodiments.

To better illustrate such upgrading and downgrading of a call, FIG. 7 shows an exemplary procedure 700 which begins at start 701. At 702 it can be determined whether a PTT call is in progress and if so, at 703 it can be further determined whether PTV services are available. If so, at 704 it can be determined whether PTV services are already in use in the present call. If PTV services are already in use it can be further determined whether floor control is owned by the communication unit wishing to, in this case, downgrade the call at 706. If floor control is owned, then the PTV service can be downgraded by, for example removing the video stream for PTV Chat mode or PTV Stream mode. If PTV services are not already in use, then the PTT call can be upgraded at 705 by adding a video stream. The call can be upgraded to PTV Chat mode or PTV Stream mode based, for example, on the camera setting. If PTV services are unavailable at 703, if the communication unit does not own floor control at 706, or when the upgrading and downgrading is complete the procedure ends at 708. It will be appreciated however that the call can be further upgraded or downgraded during the call by looping back through the procedure or by repeating certain operations such as at 705 and 707 as will be appreciated by one of ordinary skill in the art.

Figure 8:
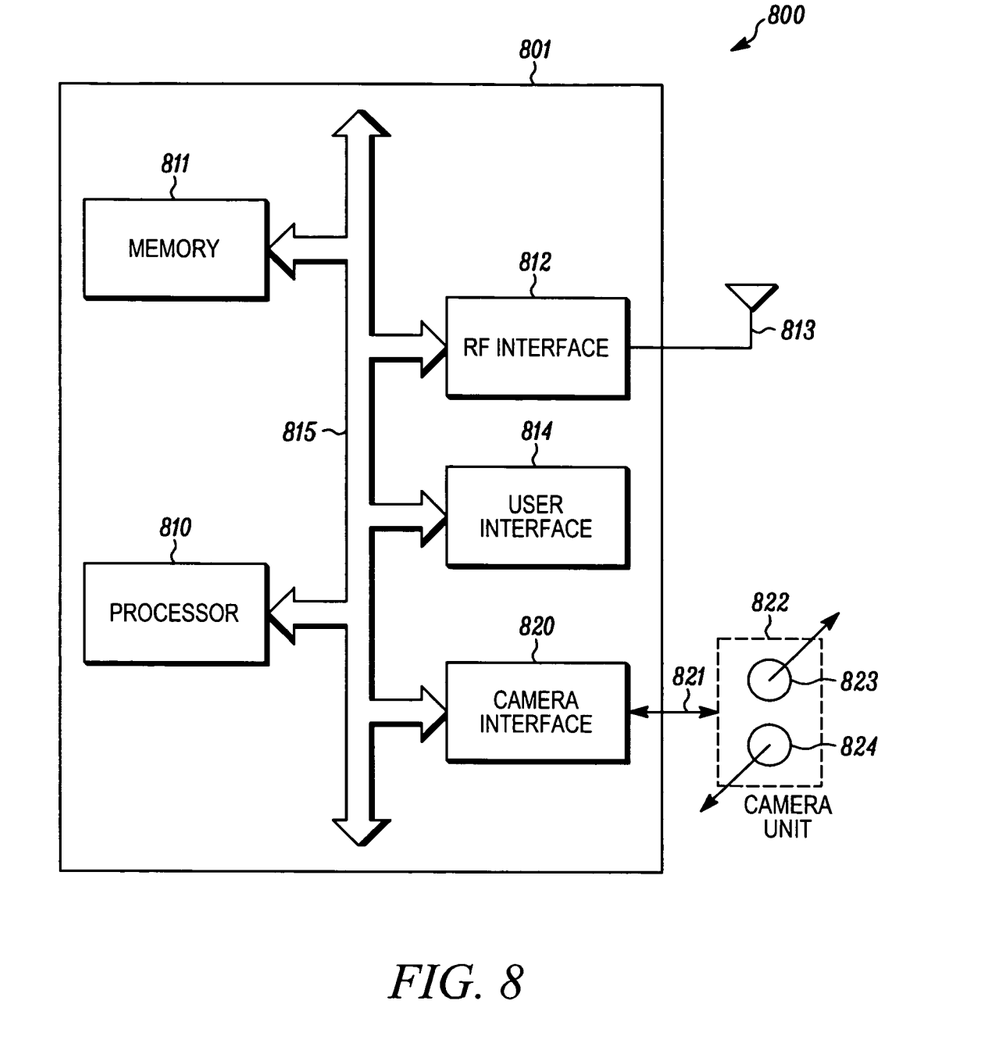
FIG. 8 is a diagram illustrating components of an exemplary apparatus in accordance with various exemplary embodiments.

An exemplary apparatus 800 such as a communication unit used for conducting peer to peer or group calls in connection with various exemplary embodiments, is depicted in a device 801 shown in FIG. 8. A processor 810, which may be a general purpose processor, or a custom configured processor, Application Specific Integrated Circuit (ASIC), or the like is coupled through a bus 315 to a memory 811, which may be a Random Access Memory (RAM) or the like, and as will be appreciated by one of ordinary skill in the art, can be resident within the processor, external to the processor, or may be external and work in connection with an internal or resident memory associated with the processor 810. The Device 801 also includes an RF interface 812 with an antenna 813 capable of receiving signals over an air interface and transmitting signals over an air interface under control of, for example the processor 810 through the bus 815, such that the device 801 can connect with and receive and transmit information such as video and audio stream information with the RAN and other devices connected thereto such as user devices participating in a peer to peer or a group call.

The device 801 includes a user interface 814 which as will be appreciated can typically have a speaker, a display configured to be capable of displaying video such as an LCD display or the like, and a button or other activator such as PTV activator. The display can be configured to display a user interface window having subwindows for displaying the current camera view as determined for example by a setting and other parameters such as a status associated with the PTV service and, for example the present PTV service mode such as PTV Chat, PTV stream, or the like as described above. It will be appreciated that in accordance with other exemplary alterative embodiments, other subwindows can be present corresponding, for example to camera views associated with other UEs involved in the call or session with individual video streams being directed to respective subwindows for display. In accordance with some exemplary embodiments, it will be appreciated that in addition to or aside from a button or mechanical activator, PTV call initiation may be accomplished in many other ways including voice activated PTV. As described herein above, the device 801 includes a camera interface 820 which is coupled through a connection 821 or directly coupled to camera unit 822 having the capability to generate an "internal" camera view 824, such as for providing a view of the user, and to generate an "external" camera view 823, such as for providing a view in the direction away from the user or the like. It will be appreciated however that the respective internal and external camera views 823 and 824 will depend on the orientation of the device 801, for example, as determined by the user by placement or pointing or the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for setting a service mode associated with a call conducted in accordance with a Push to Video (PTV) service in an originating communication unit, the method comprising:
    determining a device setting for a device associated with the originating communication unit and associated with enabling the PTV service to form a determined device setting;
    setting the service mode based on the determined device setting when the call conducted in accordance with the PTV service is initiated from the originating communication unit; and
    at least one of upgrading and downgrading the service mode after the call associated with the PTV service is initiated.

2. A method in accordance with claim 1, wherein the device service mode includes at least one of: a PTV Stream mode, a PTV Chat mode, a PTV Video mode, and a PTT mode.

3. A method in accordance with claim 1, wherein the service mode includes a streaming mode, and wherein during the streaming mode the originating communication unit obtains audio floor control for an audio stream and video floor control for a video stream when the call associated with the PTV service is initiated and relinquishes at least one of the audio floor control and the video floor control during the call.

4. A method in accordance with claim 1, wherein the originating communication unit obtains asynchronous audio floor control for an audio stream and asynchronous video floor control for a video stream when the call associated with the PTV service is initiated and is capable of relinquishing at least one of the asynchronous audio floor control and the asynchronous video floor control during the call.

5. A method in accordance with claim 1, wherein the service mode includes a chat mode, and wherein during the chat mode the originating communication unit obtains floor control for an audio stream and a video stream when the call associated with the PTV service is initiated and is capable of relinquishing the floor control during the call.

6. A method in accordance with claim 1, wherein the originating communication unit obtains synchronous floor control for an audio stream and a video stream when the call associated with the PTV service is initiated and is capable of relinquishing the synchronous floor control during the call.

7. A method in accordance with claim 1, wherein the service mode includes a Push to Talk (PTT) mode and wherein during the PTT mode the originating communication unit is configured for only an audio stream when the call associated with the PTV service is initiated and is capable of obtaining and relinquishing the audio floor control during the call.

8. A method in accordance with claim 1, wherein the service mode includes a audio-only mode and wherein during the audio-only mode the originating communication unit is configured for only an audio stream when the call associated with the PTV service is initiated and is capable of obtaining and relinquishing the audio floor control during the call and is further capable of adding and removing a video stream during the call.

9. A method in accordance with claim 1, wherein the service mode includes a video-only mode and wherein during the video-only mode the originating communication unit is configured to establish a circuit switched voice connection associated with the call when the call associated with the PTV service is initiated and is capable of initiating a packet switched video stream during the call.

10. A method for setting a service mode associated with a call conducted in accordance with a Push to Video (PTV) service in an originating communication unit, the method comprising:
    determining a device setting for a device associated with the originating communication unit and associated with enabling the PTV service to form a determined device setting; and
    setting the service mode based on the determined device setting when the call conducted in accordance with the PTV service is initiated from the originating communication unit,
    wherein the device includes a camera and the device setting includes at least one of an internal setting and an external setting.

11. A method for setting a service mode associated with a call conducted in accordance with a Push to Video (PTV) service in a communication unit, the method comprising:
    determining a preference setting associated with the communication unit and an operating feature of the PTV service to form a determined preference setting; and
    setting the service mode based on the determined preference setting when the operating feature of the PTV service associated with the call is one of upgraded and downgraded.

12. A method in accordance with claim 11, wherein the determined preference setting is associated with a preferred service mode further including at least one of: a PTV Stream mode, a PTV Chat mode, a PTV Video mode, and a PTT mode.

13. A method in accordance with claim 11, wherein the service mode includes a chat mode, and wherein during the chat mode the communication unit obtains floor control for an audio stream and a video stream when the call conducted in accordance with the PTV service is initiated and is capable of relinquishing the floor control during the call.

14. A method in accordance with claim 11, wherein the service mode includes a streaming mode and wherein during the streaming mode the originating communication unit obtains audio floor control for an audio stream and video floor control for a video stream when the call conducted in accordance with the PTV service is initiated and relinquishes at least the audio floor control during the call.

15. A method in accordance with claim 11, wherein the call includes a group call.

16. An apparatus capable of transmitting a video information stream and a corresponding audio information stream associated with a Push to Video (PTV) service to a target communication unit in a Radio Access Network (RAN), the method comprising:
- a RAN interface;
- a camera;
- a memory; and
- a processor coupled to the memory and the RAN interface, the processor configured to facilitate:
  - determining a setting for the camera to form a determined camera setting; and
  - setting a service mode associated with the PTV service based on the determined camera setting when a call conducted in accordance with the PTV service is initiated to a target communication unit.

17. An apparatus in accordance with claim 16, further comprising an activation device configured to activate the PTV service, and wherein the call is initiated using the activation device to obtain floor control associated with the video information steam and the corresponding audio information stream.

18. An apparatus in accordance with claim 16, wherein the call includes a group call, and wherein the processor:
- in setting the service mode is further configured to initiate the group call to the target communication unit and an additional target communication unit using a SIP protocol when the PTV service is activated; and
- is further configured to at least one of upgrade the PTV service mode associated with the group call and downgrade the PTV service mode associated with the group call based on the service mode.

19. An apparatus in accordance with claim 18, wherein:
- the upgrade of the PTV service mode associated with the group call includes adding the video information stream to the group call, and
- the downgrade of the PTV service mode associated with the group call includes removing the video information stream from the group call.

* * * * *